United States Patent [19]
Bienert et al.

[11] 4,023,858
[45] May 17, 1977

[54] CRANK AND DRIVE MECHANISM FOR A RAISABLE SLIDING TOP OF A MOTOR VEHICLE

[75] Inventors: Horst Bienert, Gauting; Walter Schatzler, Starnberg, both of Germany

[73] Assignee: Webasto-Werk W. Baier, K.G., Stockdorf near Munich, Germany

[22] Filed: Oct. 1, 1975

[21] Appl. No.: 618,349

[30] Foreign Application Priority Data
Oct. 3, 1974 Germany .......................... 2447190

[52] U.S. Cl. ........................................... 296/137 G
[51] Int. Cl.² ........................................... B60J 7/02
[58] Field of Search ....... 296/137 G, 137 E, 137 F, 296/137 H

[56] References Cited
UNITED STATES PATENTS

| 3,075,807 | 1/1963 | Werner | 296/137 G |
| 3,148,913 | 9/1954 | Golde | 296/137 G |
| 3,572,822 | 3/1971 | Schmid | 296/137 F |
| 3,788,160 | 1/1974 | Sielk | 296/137 G |
| 3,829,155 | 8/1974 | Lutz | 296/137 F |
| 3,976,325 | 8/1976 | Schatzler | 296/137 G |

FOREIGN PATENTS OR APPLICATIONS 2,231,326  2/1973  Germany ...................... 296/137 H Primary Examiner—Robert R. Song
Attorney, Agent, or Firm—Otto John Munz

[57] ABSTRACT

A crank and drive mechanism for a raisable sliding top such as of a motor vehicle is provided with a crank arm, with a mechanism to permit a plurality of rotations to said crank arm for a complete extension and retraction of the top, including an end stop.

Means are provided to permit, with a single operating member, the actuation of the top into sliding movements, closing movements, opening movements, locking it in a position established, maintaining the top in a locked position releasably without the necessity for additional parts and automatically indicating the closed and the open positions of the top.

11 Claims, 7 Drawing Figures

CRANK AND DRIVE MECHANISM FOR A RAISABLE SLIDING TOP OF A MOTOR VEHICLE

CROSSREFERENCE TO A RELATED APPLICATION

Priority of German Pat. application No. P 24 47 190.7 filed Oct. 3, 1974 is claimed under the Convention.

FIELD OF THE INVENTION

A crank and drive mechanism for a raisable sliding top of a motor vehicle, with a crank arm carrying a crank button and mounted on a rotary hub, the crank arm being retractable into a dish-shaped holding recess, in which structure the hub is coupled in a rotation-proof manner to a shaft, connected by means of a pair of gear-wheels, with a shaft carrying a driving pinion for the top-sliding mechanism.

DESCRIPTION OF THE PRIOR ART

In crank drives of the prior art a crank arm can be retracted only into the holding recess when it is located in a very specific position. In normal sliding tops this disadvantage is unimportant because the operation brings the sliding top into a position in which the crank arm can be retracted into the holding recess, since one crank rotation, which is the maximum necessary to bring the crank arm into the position of retractability, causes a justifiable displacement of the sliding top. In the case of a raisable sliding top, the above described situation is the same with regard to the top displacement but not with regard to the top extension. Since for the extension of the top there is provided only a relatively limited rotary movement of the crank arm, for example of a total of two rotations, only very few and in the example indicated only two positions of the raised top are available in which the crank arm can be retracted into the holding recess.

SUMMARY OF THE INVENTION

The objects of the invention are:

to provide a crank-and-drive-mechanism for a raisable sliding top of the type described whose crank arm can be retracted into a holding countersunk recess in a plurality of positions of the raised top;

to provide for the extension movement of the top an additional gearing stage in the crank and pinion which acts as a reduction gear and means to connect it in this gearing stage when the roof top is in the closed position; and to provide, for the top extension movement a gear for reducing the crank movement, which is practically limited only by space conditions and which permits, for example, five or more rotations of the crank for the complete extension of the top.

Since after each rotation the crank arm comes into a position where it can be retracted, the crank arm can in this example be retracted in five positions of the top so that only a relatively slight change in the raised top position is necessary to reach a retracted position.

Another object of the invention is to provide a gearing stage which is substantially self-locking so that the sliding top remains fixed in any lift position without requiring a special locking device.

In a preferred embodiment of the invention, the shaft on which the crank is mounted is longitudinally displaceable and has two fixed gear-wheels each with a different number of teeth. The shaft carrying the pinion has also two fixed gear-wheels with different numbers of teeth. Depending on the axial position of the shaft connected to the crank hub, the gear-wheel having the smaller number of teeth engages with the gear-wheel on the crank shaft having the larger number of teeth or the gear-wheel having the larger number of teeth engages with the gear-wheel on the crank hub shaft having the smaller number of teeth.

The longitudinal displacement of the shaft can be achieved by the device that the crank arm is mounted on the hub so as to pivot about an axis other than its center of rotation and has an extension co-operating with a recessed section on the crank hub shaft for the purpose of displacing the said shaft by pivoting the crank arm. Advantageously a spring is provided which keeps the crank hub shaft in a position in which the reduction gear is disengaged.

To obtain an end stop for the crank mechanism with the top in terminal positions, either fully retracted or with the top fully extended, a gear-wheel fixed to the crank hub shaft is provided to be in engagement by means of at least one intermediate wheel, with a ratchet wheel that has a concentric connecting link slot engaged by a pin rotatable on the crank shaft but axially displaced therewith, in which structure the transmission ratio between thia second gear-wheel and the ratchet wheel, as well as the length of the connecting link slot are dimensioned in such a manner that the pin abuts against one end of the connecting link slot when the sliding top is fully retracted and open and against the other end of the said link slot when the top is fully extended.

To maintain a stop for the sliding top that is releasable without additional operational elements in its locked position, the connecting link slot may have two sections whereof one extends from one end to a point at which the pin is located with the sliding top fully closed, and the other extends from this point to the other end of the connecting link slot, while the second section and the pin are constructed in such a way that the latter can only enter the second section after a displacement of the crank hub shaft for the purpose of connecting in the reduction gear stage.

Further details and characteristics of the invention can be learned from the following description in conjunction with the drawings which show a basic embodiment of the invention.

BRIEF DESCRIPTION OF THE DRAWINGS

There are shown in

DESCRIPTION OF THE PREFERRED EMBODIMENTS

Figure 1:
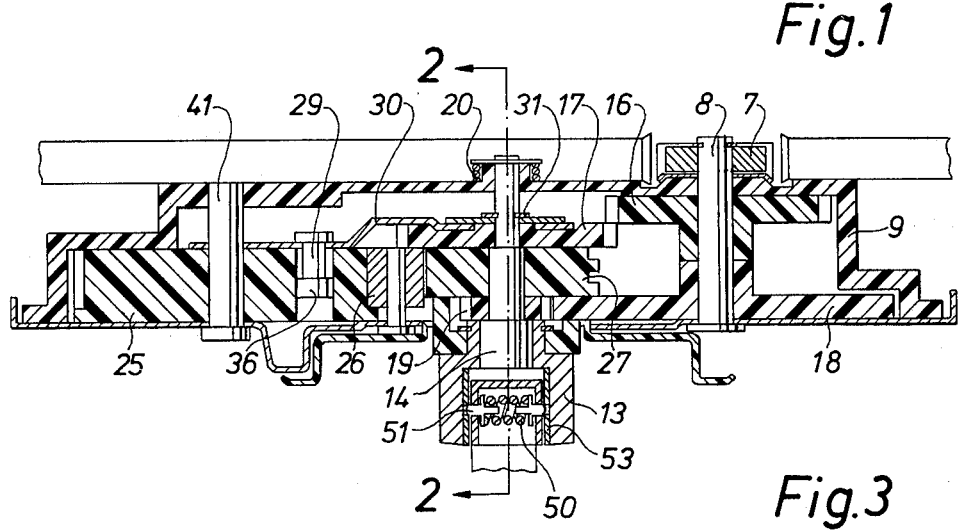
FIG. 1, a section through a crank and drive mechanism according to the invention in the position in which the sliding top has been extended by rotation of the crank arm.

In the embodiment shown the sliding top 1 is both slid and pivoted by a compression resistant cable 2, via a crank mechanism 3. The cable 2 is fixed to a transport bridge 4 supporting a lever mechanism 5 which is on the one hand connected with sliding top 1 and on the other is guided in a not shown connecting link guide at 6. Raisable sliding tops of this type are known to the art.

The crank and drive mechanism for the sliding top 1 is shown in detail in FIGS. 1 to 5. It has a driving pinion 7 whose external toothing engages with cable 2, which is compression-resistant and which is mounted on a shaft 8 pivotably supported in gear box 9. The cable and pinion connection is similar to that in U.S. Pat. No. 3,976,325, issued Aug. 24, 1976, by inventor Walter Schaetzler, assignor to Webasto-Werk W. Baier KG, of common ownership with this application. The gear box 9 is screwed to a portion 10 of the fixed top section. A crank arm 11 which is pivotably mounted at 12 on a rotary hub 13 serves to drive the pinion 7. A hub 13 is connected in a non-rotary but axially displaceable manner with a shaft 14 which is mounted on the one hand in gearbox 9 and on the other hand in hub 13. The hub is mounted pivotably in a cover plate 15. The driving connection between the shaft 14 and the pinion shaft 8 is established via pairs of gear-wheels 16, 17, or 18, 19 which can be connected alternately in a manner to be described hereinafter. The gear-wheels 16 and 18 are rigidly connected with the shaft 8, and the gear-wheels 17 and 19 are rigidly connected with the shaft 14. In this embodiment the transmission ratio of the gear-wheels 16, 17 is 1:1, and that of gear-wheels 18, 19 is 4:1. The gear-wheels 17 and 19 can engage alternately with gear-wheels 16 and 18 as a result of axial displacement of shaft 14.

Figure 2:
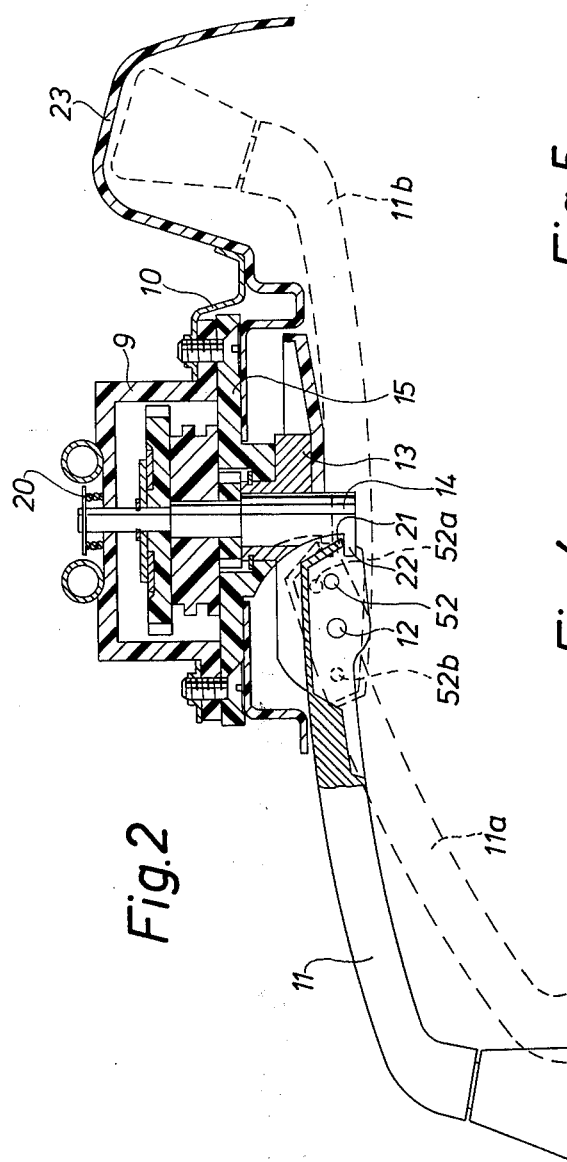
FIG. 2, a section along the line 2 — 2 in FIG. 1.
Figure 4:
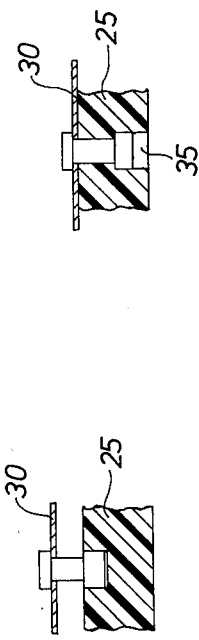
FIG. 4, a section along the line 4 — 4 in FIG. 3.
Figure 5:
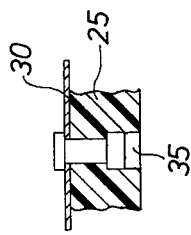
FIG. 5, a section along the line 5 — 5 in FIG. 3.

The shaft 14 is under the action of a spring 20 which attempts to pull this shaft upward as shown on FIG. 1. Thereby the gear-wheel 17 engages with the gear-wheel 16. In this position the sliding top is slid by the rotating crank arm 11, from its closed position under the fixed top section or is brought back from the open position into the closed position. When the sliding top is to be extended or raised from the closed position, the shaft 14 in FIG. 1 is moved downward so that the gear-wheels 16 and 17 are disengaged and the gear-wheels 18 and 19 are engaged. This position is shown on FIG. 1. The shaft 14 is displaced by the pivoting crank arm 11 upward into the fully extended position of FIG. 2 whereby it seizes with an extension 21 a recessed section 22 at the lower end of the shaft 14 and pulls this shaft downward against the action of spring 20. As can be seen in FIG. 2, a holding recess 23 is provided in the inner top layer into which the crank arm 11 can be folded. By means of the reduction gearing produced by the size of gear-wheels 18 and 19, the folding of the crank arm 11 can take place in a plurality of positions of the raised sliding top.

To obtain a stop for the crank arm in the fully opened position, in the closed position, and in the fully extended position of the sliding top, a ratchet wheel 25 is provided in the gearbox which engages via a pinion 26 with a gear-wheel 27 fixed on the shaft 14. In the ratchet wheel 25 a connecting link slot 28 is provided which is engaged by a pin 29 fixed to a plate 30, the latter being rotatably mounted on shaft 14. It is, however, secured against displacement relative to the shaft 14 by a spring ring 31. The transmission ratio between the gear-wheel 27 and the ratchet wheel 25, as well as the length of the connection link slot 28 are dimensioned in such a way that pin 29 abuts against one end 32 of the connecting link slot when the sliding top 1 is fully slid back, and open, and against the other end 33 of the said slot when the sliding top is fully exposed or closed. To enable the user to determine when the sliding top is in its closed position, the connecting link slot is subdivided into two portions 34 and 35 and the pin 29 can slide, in the link slot portion 34 only, with its thickened end 36 in the normal displacement position of the crank mechanism. This is in the position of the shaft 14 in which the gear wheels 16 and 17 are engaged. With the sliding top closed, the pin 29 abuts with its thickened end 36 against the end 37 of the connecting link slot portion 34. When then the crank arm 11 is pivoted upward so as to extend the sliding top as is shown on FIG. 2, then, in the manner described above, the shaft 14 is moved downward and by means of plate 30 carries the pin 29 with it, which as a result can enter the link slot portion 35. On rotating crank 11 for the purpose of extending the sliding top 1, the ratchet wheel 25 also rotates until pin 29 abuts against the end 33 of link slot portion 35. In this position the sliding top is fully extended.

By this arrangement the sliding top can be raised only from its closed position because only in this position the pin 29 can change from the one connecting link slot section 34 into the other connecting link slot section 35. This changeover is made possible by a bore 40 which interconnects the two connecting link slot sections 34 and 35 and is arranged in a position that corresponds to the closed position of the sliding top 1. Thus the plate 30 which carries the pin 29 is prevented from rotating in this embodiment, by being traversed by the spindle 41 of the ratchet wheel 25.

Figure 3:
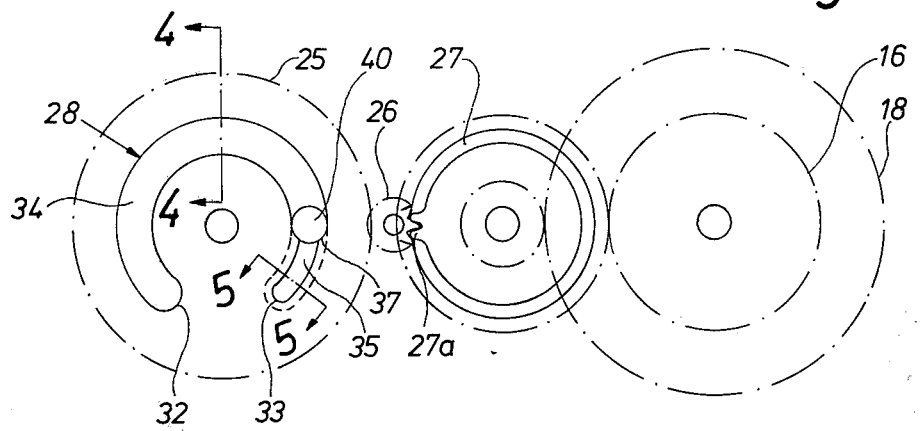
FIG. 3, a diagrammatical representation of the gear-wheels of the gear shown in FIG. 1.
Figure 6:
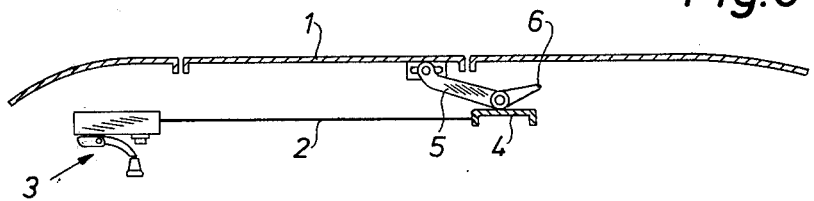
FIG. 6, a diagrammatical representation of a vehicle top with the sliding top in the closed position.
Figure 7:
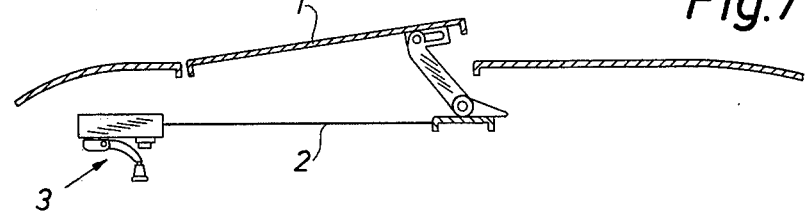
FIG. 7, a representation as in FIG. 6 but with the sliding top extended.

As can be seen in FIG. 3, gear-wheel 27 has only one pair of teeth 27a so that the ratchet wheel 25 can be advanced only once during each rotation of the gear-wheel 27. Thereby the large transmission ratio relative to ratchet wheel 25 which would be necessary with a complete toothing of gear wheel 27 is avoided. Such drives are employed for the purpose of driving tachometers.

FIG. 2 shows the locked setting of the crank arm in its three positions namely the extended position, drawn in full lines in FIG. 2 for raising the top, in the position 11a for the normal displacement of the top and in the retracted position 11b, both shown in dotted lines in FIG. 2. It comprises two blocking members 51 held apart by a spring 50 and positioned in crank arm 11, which blocking members cooperate with corresponding recesses 52, 52a and 52b in the corresponding positions of the crank arm 11. The recesses 52, 52a and 52b are positioned in stop plates 53 inserted in the crank hub 13.

The apparatus of the invention renders superfluously an independent locking system for the sliding top, particularly in an extended position, since the gear consisting of gear-wheels 18 and 19 is self-locking and a further locking is provided by crank arm 11 after being folded into the holding recess 23.

Thus, unlike the known crank and drive mechanism for a raisable sliding top, the invention also makes it possible to solve the problem of carrying out all operations for the actuation of the sliding top, namely the sliding, the extending and the release of the locking system in the closed position so as to permit the extending movement with a single operating member, namely the crank arm. The closed position of the top when it is retracted from the open position is indicated automatically to the operator, namely by the aforementioned abutment of pin 29 against the end 37 of the connecting link slot section 34. For extending the top the operator merely has to pivot the crank arm 11 upward, whereby the reduction gear stage 18, 19 is connected in. The end of the extension movement is indicated by the abutment of pin 29 against the end 33 of the connecting link slot section 35. When the sliding top is retracted from its extended position into the closed position, the pin 29 abuts against the wall of bore 40 on reaching the closed position. The crank arm 11 permits then no further rotation since the pin 29 cannot move out of the connecting link section 35 because, due to the locking of the crank arm 11 in the up-tilted position, the shaft 14 cannot be displaced upward.

Obviously numerous modifications of the embodiment shown are conceivable without exceeding the scope of the invention. Thus, it is possible to use instead of the gear wheel 27, one of the gear-wheels 17, 19 for driving the ratchet wheel 25 and to provide a second gearing stage. Furthermore, the axial displacement of the shaft 14 can be achieved by means other than by pivoting the crank arm 11.

What is claimed is:
1. In a vehicle roof comprising an opening,
    a panel within said opening with a plurality of positions
    a crank and a drive mechanism for moving said panel from
    a closed position alternately into a retracted or in a raised position and back into the closed position
    said mechanism including:
        a crank arm with a crank shaft;
        said crank arm fixed to said crank shaft;
        said crank shaft non-rotatably carrying:
            a first gear wheel,
            a driving pinion with a shaft for moving said panel and fixed to said pinion shaft,
        said pinion shaft further carrying
            a second gear wheel non-rotatably secured thereto,
            said first and second gear wheels forming a first transmission path between said crank shaft and pinion shaft,
    said vehicle roof further comprising:
        a crank arm holding recess, and
        said mechanism including means to retract the said crank arm into said holding recess in a plurality of positions of the panel,
        the improvement forming a second transmission path between said crank shaft and said pinion shaft with a reduction transmission ratio greater than that of the first transmission and means for engaging said second transmission path in lieu of the first transmission path in the closed position of said panel for moving said panel into a raised position.

2. A crank drive mechanism for a raisable sliding top, as claimed in claim 1 further comprising:
    means on the mechanism to provide for a plurality of rotations to said crank arm for a complete extension of said top.

3. A crank and drive mechanism for a raisable sliding top, as claimed in claim 1, further comprising
    means on the mechanism to obtain an end stop for the crank arm mechanism with the top in a terminal position.

4. A crank and drive mechanism for a raisable sliding top, as claimed in claim 3, further comprising
    means on the mechanism to maintain the said stop in a locked position releasably without the necessity for additional parts.

5. A crank and drive mechanism for a raisable sliding top, as claimed in claim 1, further comprising:
    a second pair of gear wheels relatively non-rotatable on the pinion shaft spaced apart differently than the hub shaft gear wheels;
    means on the mechanism to shift the shaft gears so as to selectively mesh a gear of one pair with a corresponding gear of the other upon pivoting the crank arm to shift the shaft axially.

6. A crank and drive mechanism for a raisable sliding top, as claimed in claim 1, further providing:
    a second pair of gear wheels on the pinion shaft relatively non-rotatable thereto;
    each one of the first pair of gear wheels selectively engageable with a corresponding one of the second pair of gear wheels;
    one of the first pair of gear wheels have a lesser number of teeth than the other, thereby enabling the reduction gearing with the driving pinion when the one gear engages with the corresponding gear on the pinion shaft; and
    means on the drive mechanism to shift-in the reduction gearing in the closed position of the top.

7. A crank and drive mechanism for a raisable sliding top as claimed in claim 1, further comprising:
    a crank hub fixedly mounted on the gear shaft providing a hub shaft;
    the said hub shaft axially displaceably mounted on the mechanism;
    the gear wheels on the said hub shaft having differing numbers of teeth;
    the pinion shaft having two gear wheels fixed thereon with differing numbers of teeth, the pinion shaft being fixed axially;
    means on the said mechanism to engage in one axial position of the said hub shaft the said gear wheel thereon having the smaller number of teeth with the said gear wheel of the said pinion shaft having the larger number of teeth and in another axial position of the said hub shaft the said gear wheel thereon having the larger number of teeth with the gear wheel on the said pinion shaft having the smaller number of teeth.

8. A crank and drive mechanism for a raisable sliding top, as claimed in claim 7,
    said crank arm being mounted on the said hub so as to pivot about an axis other than its center of rotation;
    said crank arm having a crank arm extension;
    said hub shaft having a recessed section;
    said crank arm extension having means cooperating with said
    recessed section of the hub shaft for the purpose of displacing the hub shaft, when the crank arm is pivoted.

9. A crank and drive mechanism for a raisable sliding top as claimed in claim 7, further comprising a spring means mounted on the crank hub shaft to keep the crank hub shaft in a position in which the gear on the hub shaft with the smaller number of teeth is disengaged from the gear on the pinion shaft having the larger number of teeth, the engagement of these two gears constituting a reduction gear or stage.

10. A crank and drive mechanism for a raisable sliding top, as claimed in claim 7, further comprising a gear-wheel fixed to the crank shaft engaging via at least one intermediate wheel with a ratchet wheel having a concentric connecting link slot, a pin rotatable on the crank hub shaft and displaceable therewith engaging said slot, the transmission ratio between the last named gear-wheel and the ratchet wheel as well as the length of the connecting link slot having means dimensioned in such a way that the pin abuts against one end of the connecting link slot when the sliding roof is fully retracted and open and against the other end of the said slot when the top is fully extended.

11. A crank and drive mechanism for a raisable sliding top, as claimed in claim 10, said connecting link slot having two sections of which one extends from one end to a point at which the pin is located with the top fully closed and the other section extends from this point to the other end of the connecting link slot, while the second section and the pin has means constructed in such a way that the latter can only enter the second section after the displacement of the crank hub shaft for the purpose of connecting-in the reduction stage has taken place.

* * * * *